UNITED STATES PATENT OFFICE 2,656,363

PROCESS FOR PREPARING CYCLOPENTANO-PERHYDROPHENANTHRENE DERIVATIVES

Francisco Neúmann, John Pataki, and Stephen Kaufmann, Mexico City, Mexico, assignors to Syntex S. A., Mexico City, Mexico, a corporation of Mexico No Drawing. Application October 30, 1950, Serial No. 193,021

3 Claims. (Cl. 260—397.1)

The present invention relates to a new process for the preparation of cyclopentanoperhydrophenanthrene derivatives.

More particularly the present invention relates to a novel process for the production of 3α-hydroxy-11-ketocholanic acid. The aforementioned acid is a valuable intermediate for the preparation of therapeutic compounds.

In accordance with the present invention it has been discovered that the aforementioned compound could be readily prepared in good yield from the known compound 3α,12β-dihydroxy-11-ketocholanic acid and especially 3-monoacyl derivatives of this acid. The following equations serve to illustrate the general process involved in the present invention:

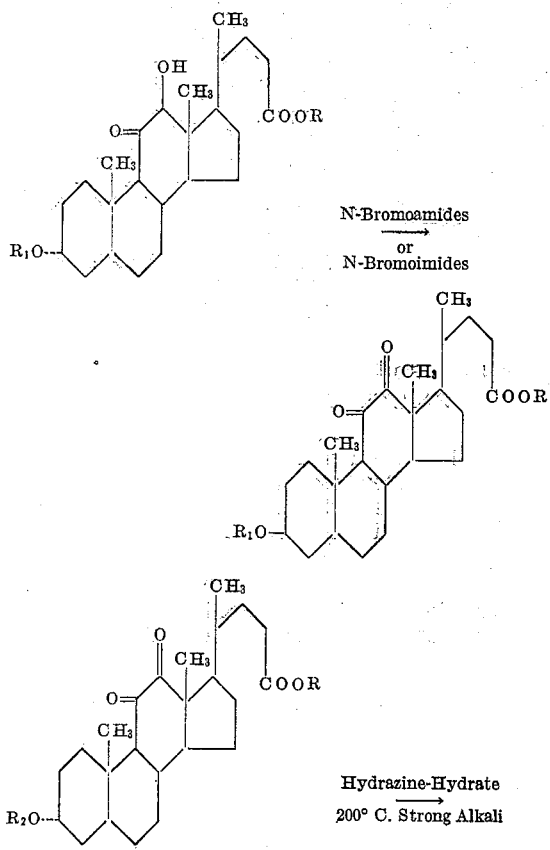

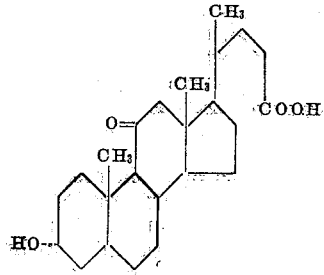

In the above equations R may be hydrogen, an alkyl group such as methyl, ethyl or propyl or an aryl group such as benzyl or allicyclic such as cyclohexyl; $R_1$ may be a monoacyl group, the residue of a fatty acid such as acetic, the residue of a dibasic acid such as succinic or the residue of an aromatic acid such as benzoic; $R_2$ may be hydrogen or an acyl group similar to $R_1$.

The process according to the present invention may be carried out by dissolving the 3-monoacyl-derivatives of 3α,12β-dihydroxy-11-ketocholanic acid in a suitable organic solvent in admixture with water and thereafter adding a suitable N-bromo acid-amide or N-bromo acid-imide in slight molar excess, preferably N-bromoacetamide or N-bromosuccinimide, together with glacial acetic acid.

Although N-bromoacetamide or N-bromosuccinimide is the preferred oxidizing agent, other brominated amides or imides may be used, such as bromotoluenesulfonimide or bromophthalimide. The reaction mixture is then allowed to stand at room temperature for approximately four hours and water is then added slowly to precipitate the desired product, as for example, 3α-hemisuccinoxy-11,12-methyl-cholanic acid or other equivalent acyl derivatives of the acid or esters thereof, as above described.

Thereafter, in accordance with the second equation indicated above, the compounds produced may be dissolved in a suitable solvent, such as diethylene glycol or triethylene glycol, sufficient glycol being preferably used so that a clear or nearly clear reaction mixture is obtained during the subsequent heating period, and hydrazine-hydrate added thereto. Preferably an amount of 85% hydrazine-hydrate is used so that the hydrazine-hydrate is in substantial excess, as for example 3 mols or more. The reaction mixture is preferably first refluxed for a period of approximately one hour and thereafter a suitable strong alkali, preferably an alkali metal hydroxide such as potassium or sodium hydroxide, is added and the mixture refluxed for another period of time, as for example thirty minutes. Preferably such an amount of alkali is used so that there will be about 10% of alkali to the volume of glycol used. The reflux condenser is then removed and the solution is kept boiling in an open vessel or with the use of a take-off adapter until the temperature has risen to approximately 200° C. Thereafter the reaction mixture is once again refluxed for a period of time, as for example three hours, chilled and diluted with water. Upon acidification with a suitable acid the desired product 3α-hydroxy-11-keto-cholanic acid precipitates in good yield. The cholanic acid thus produced may be further purified by recrystallization from a suitable solvent such as methanol.

In place of the 3-acyl derivatives of the abovementioned cholanic acid or its esters the 3α-hydroxy derivatives may also be used. These may be prepared by acid or alkaline hydrolysis of the product of the amide or imide oxidation as above described, or these last compounds may be prepared in other ways known in the art.

The following specific examples serve to illustrate but are not intended to limit this invention:

Example I 5 grams of 3α-hemisuccinoxy-11-keto-12β-hydroxy-methyl-cholanate, melting point 142° C., were dissolved in 100 cc. acetone and 33 cc. water. 1.8 grams (1,1 mols) of N-bromoacetamide, and 9 cc. of glacial acetic acid were added, and the mixture was allowed to stand at room temperature for four hours. Water was then added slowly and the crystalline precipitate of 3α-hemisuccinoxy-11,12-diketo-methyl-cholanate was filtered. Crystallization from methanol gave leaflets of melting point 193° C.

Example II

Following the procedure of Example I, 3α-hemisuccinoxy-11-keto-12-hydroxy cholanic acid on treatment with 1.1 mols of N-bromosuccinimide, yielded 3α-hemisuccinoxy-11,12-diketo cholanic acid, which crystallized from methanol in leaflets, melting point 233–236° C.

Example III 10 grams of 3α-hemisuccinoxy-11,12-diketomethyl cholanate, of Example I, were dissolved in 100 cc. of warm diethylene-glycol and 10 cc. of hydrazine-hydrate (85%) were added. After refluxing for one hour, 10 grams of potassium hydroxide in 10 cc. of water were added slowly and refluxing was continued for thirty minutes. The reflux condenser was removed and the solution kept boiling in the open vessel until the temperature was raised to about 200°. After refluxing 3 hours at this temperature, the mixture was chilled and diluted with about 400 cc. of water. On acidification, 3α-hydroxy-11-keto cholanic acid was precipitated. Crystallization from methanol yielded prisms melting at 212–217° C.

Example IV 10 grams of 3α-hemisuccinoxy-11,12-diketocholanic acid of Example II were treated as described in Example III, yielding the same 3α-hydroxy - 11 - keto-cholanic acid melting at 212–217° C.

Example VI 10 grams of 3α-hydroxy-11,12-diketo cholanic acid were treated as described in Example III, yielding the same 3α-hydroxy-11-keto-cholanic acid melting at 212–217° C.

We claim:

1. A method for preparing 3α-hydroxy-11-keto-cholanic acid which comprises oxidizing a compound selected from the group consisting of 3-mono-acyl derivatives of 3α-12β-dihydroxy-11-keto-cholanic acid and esters thereof with an oxidizing agent selected from the class consisting of N-bromo acid-amides and N-bromo acid-imides to the corresponding derivatives of 3α-hydroxy-11,12-diketo-cholanic acid and thereafter dissolving said last-mentioned cholanic acid derivatives in a solvent selected from the class consisting of diethylene glycol and triethylene glycol and reducing by heating with hydrazine-hydrate in the presence of a strong alkali.

2. A method for preparing 3α-hydroxy-11-keto-cholanic acid which comprises oxidizing 3α-hemisuccinoxy-11-keto-12-hydroxy methyl-cholanate with an oxidizing agent selected from the class consisting of N-bromo acid-amides and N-bromo acd-imides to produce 3α-hemisuccinoxy-11,12 - diketo - methyl - cholanate and thereafter dissolving said last-mentioned cholanate in a solvent selected from the class consisting of diethylene glycol and triethylene glycol and reducing by heating with hydrazine-hydrate in the presence of a strong alkali.

3. A method for preparing 3α-hydroxy-11-keto-cholanic acid which comprises oxidizing 3α-hemisuccinoxy-11-keto-12-hydroxy-cholanic acid with an oxidizing agent selected from the class consisting of N-bromo acid-amides and N-bromo acid-imides to produce 3α-hemisuccinoxy-11,12-diketo-cholanic acid and thereafter dissolving said last-mentioned cholanic acid in a solvent selected from the class consisting of diethylene glycol and triethylene glycol and reducing by heating with hydrazine-hydrate in the presence of a strong alkali.

FRANCISCO NEÚMANN.
JOHN PATAKI.
STEPHEN KAUFMANN.

References Cited in the file of this patent

UNITED STATES PATENTS

| Number | Name | Date |
|---|---|---|
| 2,397,656 | Gallagher | Apr. 2, 1946 |
| 2,403,683 | Reichstein | July 9, 1946 |
| 2,447,325 | Gallagher | Aug. 17, 1948 |
| 2,471,697 | Minlon | May 31, 1949 |

OTHER REFERENCES

Fieser et al., Natural Products Related to Phenanthrene, 3d Edition, pp. 409–410 (1949).